June 18, 1974 H. L. McDERMOTT Re. 28,051

TORQUE TRANSMITTING DEVICE

Original Filed May 11, 1966 4 Sheets-Sheet 1

INVENTOR.
HUGH L. McDERMOTT

BY
Wayne B. Easton
ATTORNEY

TORQUE TRANSMITTING DEVICE

Original Filed May 11, 1966 4 Sheets-Sheet 2

INVENTOR.
HUGH L. McDERMOTT
BY
Wayne B. Easton
ATTORNEY

TORQUE TRANSMITTING DEVICE

Original Filed May 11, 1966 4 Sheets-Sheet 3

INVENTOR,
HUGH L. McDERMOTT

BY Wayne B. Easton
ATTORNEY

TORQUE TRANSMITTING DEVICE

Original Filed May 11, 1966 4 Sheets-Sheet 4

INVENTOR.
HUGH L. McDERMOTT
BY
Wayne B. Easton
ATTORNEY

United States Patent Office

Re. 28,051
Reissued June 18, 1974

28,051

TORQUE TRANSMITTING DEVICE

Hugh L. McDermott, Edina, Minn., assignor to Eaton Corporation, Cleveland, Ohio

Original No. 3,389,618, dated June 25, 1968, Ser. No. 549,240, May 11, 1966. Application for reissue Apr. 9, 1970, Ser. No. 27,191

Int. Cl. F01c *21/00;* F16d *3/04;* F16h *1/28*

U.S. Cl. 418—61 4 Claims

Matter enclosed in heavy brackets [ ] appears in the original patent but forms no part of this reissue specification; matter printed in italics indicates the additions made by reissue.

ABSTRACT OF THE DISCLOSURE

A drive mechanism for transmitting torque between two relatively orbital members, the mechanism comprising a plurality of circumferentally arranged articulated holes, with each hole being formed partly in one member and partly in the other, and a like number of rollers respectively and loosely disposed in the articulated holes.

This invention relates to a torque transmitting device for transmitting torque between a first member which is rotatable or stationary and a second member which is eccentrically disposed relative to said first member and which is capable of orbital movement and which may or may not also be capable of rotational movement.

A prior art form of a torque transmitting device of the type referred to above is shown in German Pat. No. 535,807. In the prior art type of device shown in the patent the means for transmitting torque between two relatively orbitably moveable members comprises a plurality of circumferentially arranged holes in one of the members and a circumferentially arranged plurality of rollers or pins for disposition in the holes fixedly attached to the other of the members. One inherent characteristic of the prior art construction is that a separate plate member to which the roller members are attached must be provided.

In the torque transmitting device of the present invention the means for transmitting torque between two relatively orbital members comprises a plurality of circumferentially arranged, articulated holes, with each hole being formed partly in one member and partly in the other, and a like number of rollers respectively and loosely disposed in the articulated holes.

Two advantages the present invention has over the prior art are (1) the need for a separate plate or the like for carrying rollers attached thereto is eliminated and (2) the space requirement for the separate plate or the like in an axial direction is eliminated.

A main object of the invention is to provide a new and improved torque transmitting device as described herein.

Other objects and advantages of the invention will become apparent from the following specifications, drawings and appended claims.

The present invention has general utility and it is only by way of example that it is illustrated herein as being embodied in fluid pressure devices which may be utilized as pumps or motors.

Figure 1:
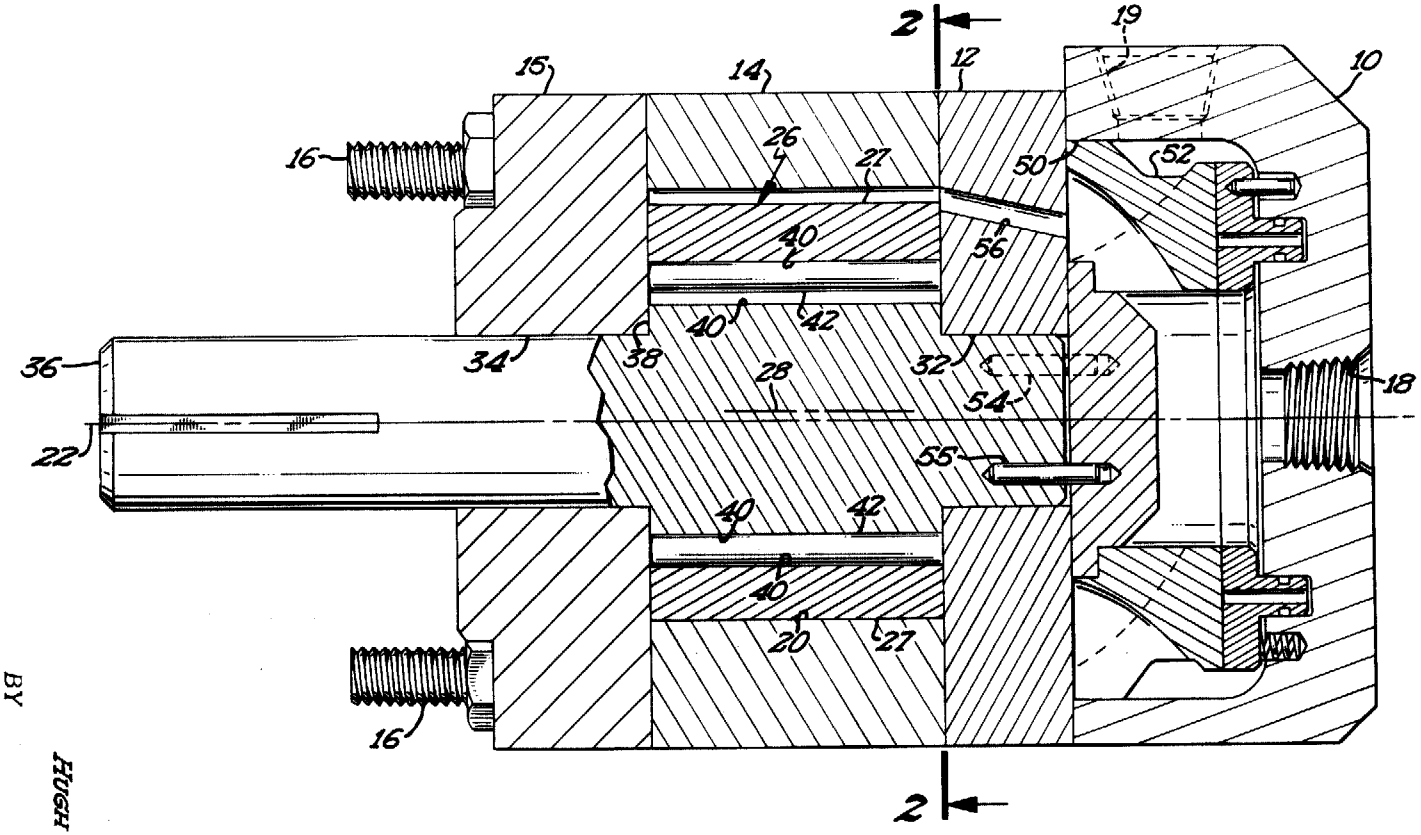
FIG. 1 is a longitudinal sectional view of a fluid pressure device in which a first embodiment of the torque transmitting device of the present invention is embodied.
Figure 2:
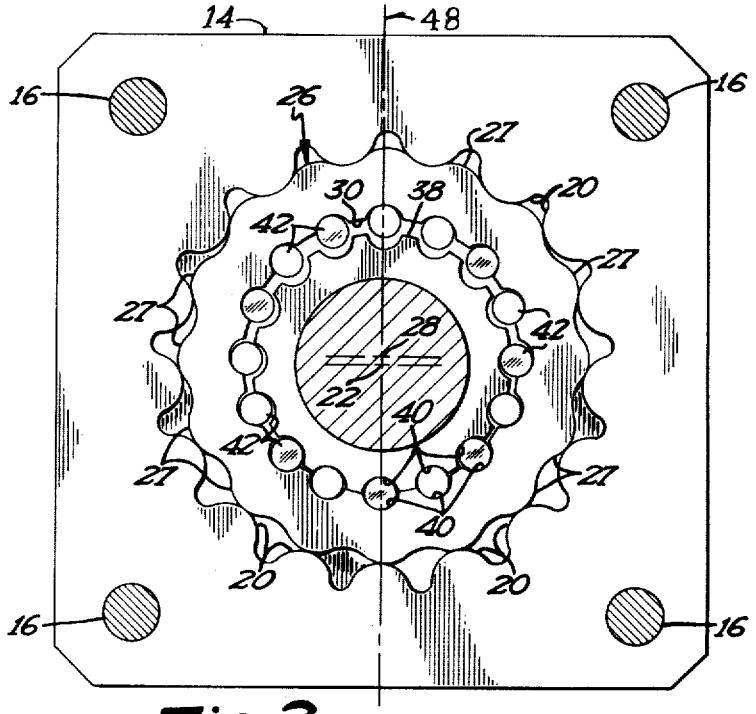
FIG. 2 is a sectional view taken on line 2—2 of FIG. 1.
Figure 3:
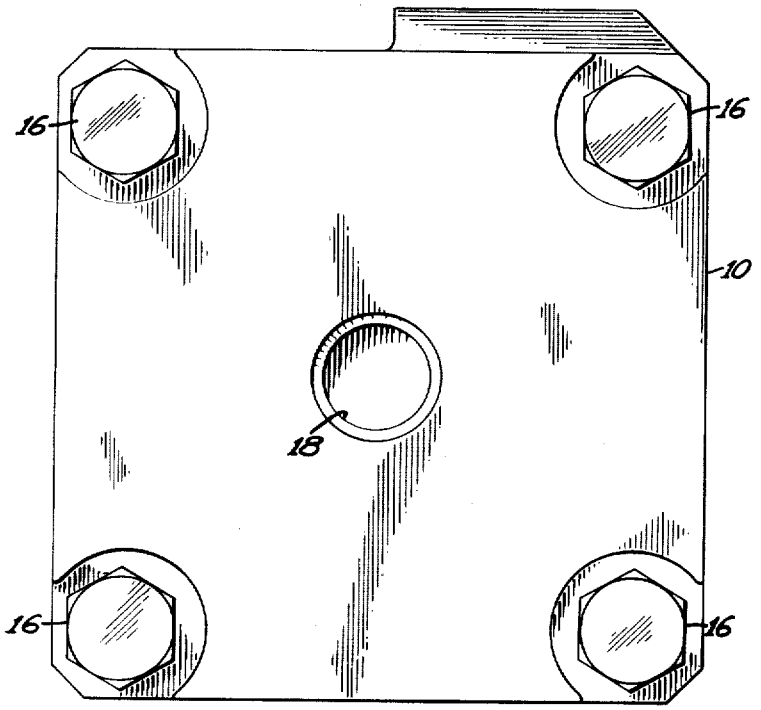
FIG. 3 is an end view taken from the right side of FIG. 1.

In the fluid pressure motor or pump illustrated in FIGS. 1 to 3 there is provided a casing or housing made of several sections which are a valve casing section 10, a fluid passage casing section 12, a gerotor casing section 14 and an end section 15. Casing sections 10, 12, 14 and 15 are generally rectangular in shape and are held together in axial and radial alignment by four circumferentially spaced bolts 16. Casing section 10 is provided with inlet and outlet ports 18 and 19 which could be reversed for operation of the pump or motor in the opposite direction.

Referring to FIG. 2, gerotor casing section 14 has a plurality of circumferentially arranged internal teeth 20 which are concentrically arranged relative to a longitudinally extending axis 22. An externally toothed star member 26 having at least one fewer teeth 27 than gerotor casing section 14 which may be referred to as ring member 14, has the teeth thereof in meshing engagement with the teeth 20 of ring member 14. Star member 26 partakes of a hypocycloidal movement with the geometric axis 28 thereof defining or having a circular orbital path about the axis 22 of the ring member 14. Star 26 is equal in axial length to ring member 14 and is *in* sealing engagement with adjacent annular surfaces of casing sections 12 and 15 between which star 26 is disposed. Star 26 has a cylindrical bore 30 which is concentrically disposed relative to star axis 28 and eccentrically disposed relative to ring axis 22. Ring member 14 and star member 26 which comprise a gerotor mechanism may be used as the rotor and stator elements of a fluid pressure motor or pump.

Casing sections 12 and 15 have bores 32 and 34 which constitute bearing surfaces and which are concentric relative to ring axis 22. Rotatably disposed and journalled in bores 32 and 34 is a shaft 36 which has a cylindrically shaped intermediate portion 38 which is concentrically arranged relative to axis 22 and has a larger diameter than the end portions of the shaft. Intermediate shaft portion 38 is disposed in star bore 30 and is illustrated as being equal in axial length to star member 26 and as having a diameter equal to the diameter of star bore 30 minus [twice] the distance between axes 22 and 28. The diameter of shaft portion 38 may be somewhat smaller than illustrated, relative to star bore 30, but not larger if interference is to be avoided.

A plurality of articulated holes 40 are provided between star 26 and shaft portion 38. Each hole 40 would have the two halves thereof in a cylindrically shaped locus if star 26 were concentrically positioned relative to shaft portion 38. [As] *Since* star 28 is always eccentrically disposed relative to shaft portion 38, [however] none of the holes 40 ever have both surfaces thereof entirely within a single, cylindrically shaped locus. In referring to the size of a hole 40 reference will be made to the "effective" diameter of the hole which will mean the diameter it would have if star 26 and shaft portion 38 were arranged concentrically.

Disposed in holes 40 are a corresponding number of cylindrically shaped rollers 42. The "effective" diameter of each hole 40 is equal to the diameter of a roller 42 therein plus [twice] the distance between axes 22 and 28. The rollers 42 provide torque transmitting connections between shaft portion 38 and star 26 and with the construction illustrated, having regard to the shapes and the relative sizes of the holes 40 and rollers 42, a true rolling action results between the rollers 42 and shaft portion 38 and between rollers 42 and star 26.

With reference to FIG. 2, externally toothed star member 26 is disposed eccentrically in the chamber or space formed and surrounded by ring member 14 and the axis 28 of star member 26 is movable in a circular orbital path about the axis 22 of ring member 14. During orbital movement of star member 26 the teeth 27 thereof intermesh with the ring member teeth 20 in sealing engagement to form expanding and contracting cells which are equal in number to the number of [star] *ring* member teeth [27] *20*.

With further reference to FIG. 2, a vertical centerline 48 incidentally represents the line of eccentricity for the star member 26 for that particular position of the star member relative to the ring member 14. During orbital movement of the star member 26, assuming the orbital movement is clockwise, the cells on the left side of the line of eccentricity would be expanding and the cells on the right side would be contracting. In operation a star member 26 having sixteen teeth will make one revolution about its own axis 28 for every sixteen times the star member orbits in the opposite direction about the axis 22 of the ring member 14. When the fluid pressure device is utilized as a pump, star member 26 will be gyrated and rotated by a turning force applied to shaft 36 and transmitted to star member 26 through rollers 42. When the fluid pressure device is used as a motor, the force created by the gyration and rotation of star member 26 will be transmitted through rollers 42 to shaft 36 to cause turning of shaft 36. The valving arrangement which facilitates the pumping or motor action will be referred to further on herein.

During the manufacturing operations the start 26 and shaft portion 38 of shaft 36 may be arranged with fixtures or the like such that the respective axes 28 and 22 are coaxial. A plurality of cylindrically shaped holes 40 may then be drilled which are equidistant from and circumferentially arranged relative to the coaxial axes 28 and 22. The holes 40 extend axially and are parallel relative to the coaxial axes 22 and 28 and are articulated by reason of being formed partially in the star member 26 and partially in the shaft portion 38.

Valve casing section 10 has an axially extending bore 50 which is concentric relative to axis 22. Rotatably disposed in bore 50 is a generally cylindrically shaped valve 52 which is connected to shaft 36 by means of drive pins 54 and 55 so as to be rotatable therewith relative to casing sections 10 and 12. Casing sectoin 12 has seventeen axially extending, circumferentially arranged passages 56 which are periodically in fluid communication with inlet and outlet passages in valve 52 in a known manner to provide for the flow of fluid from inlet port 18 to expanding chambers formed between the teeth of the star and ring members and for the flow of fluid from contracting chambers formed between the teeth of the star and ring members to the outlet port 19.

In the fluid pressure motor or pump illustrated in FIGS. 3 to 6 there is provided a casing or housing made of several sections which are a valve casing section 110, a fluid passage casing section 112, a gerotor casing section 114 and an end section 115. Casing sections 110, 112, 114 and 115 are generally rectangular in shape and are held together in axial and radial alignment by four circumferentially spaced bolts 116. Casing section 110 is provided with inlet and outlet ports 117 and 118 which could be reversed for operation of the pump or motor in the opposite direciton.

Figure 5:
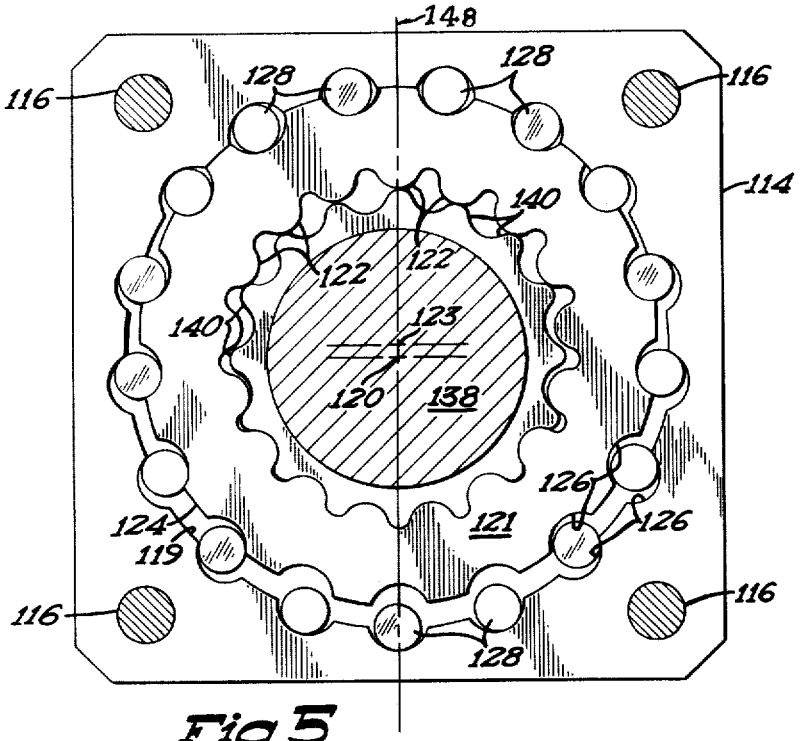
FIG. 5 is a sectional view taken on line 5—5 of FIG. 1.
Figure 6:
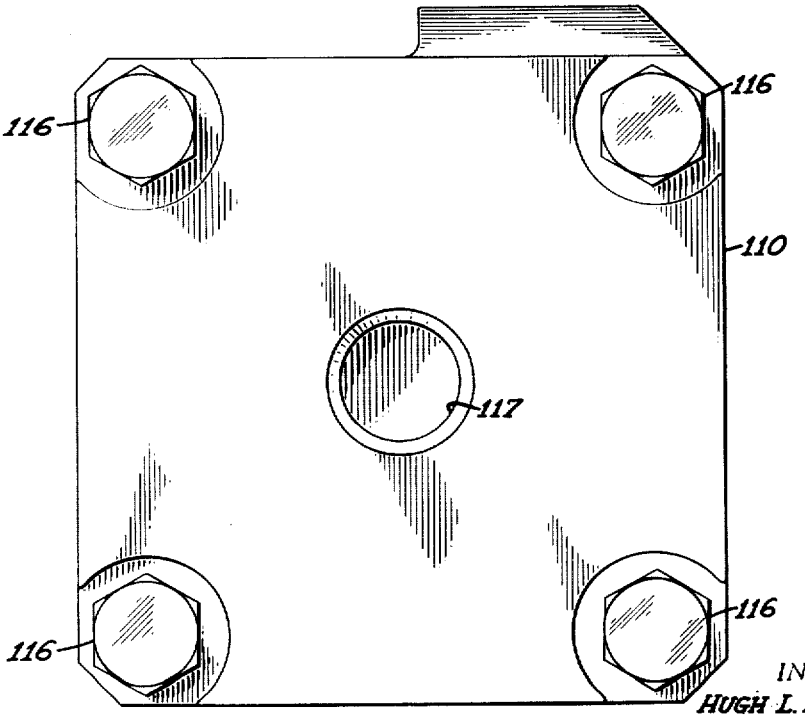
FIG. 6 is an end view taken from the right side of FIG. 4.
Figure 4:
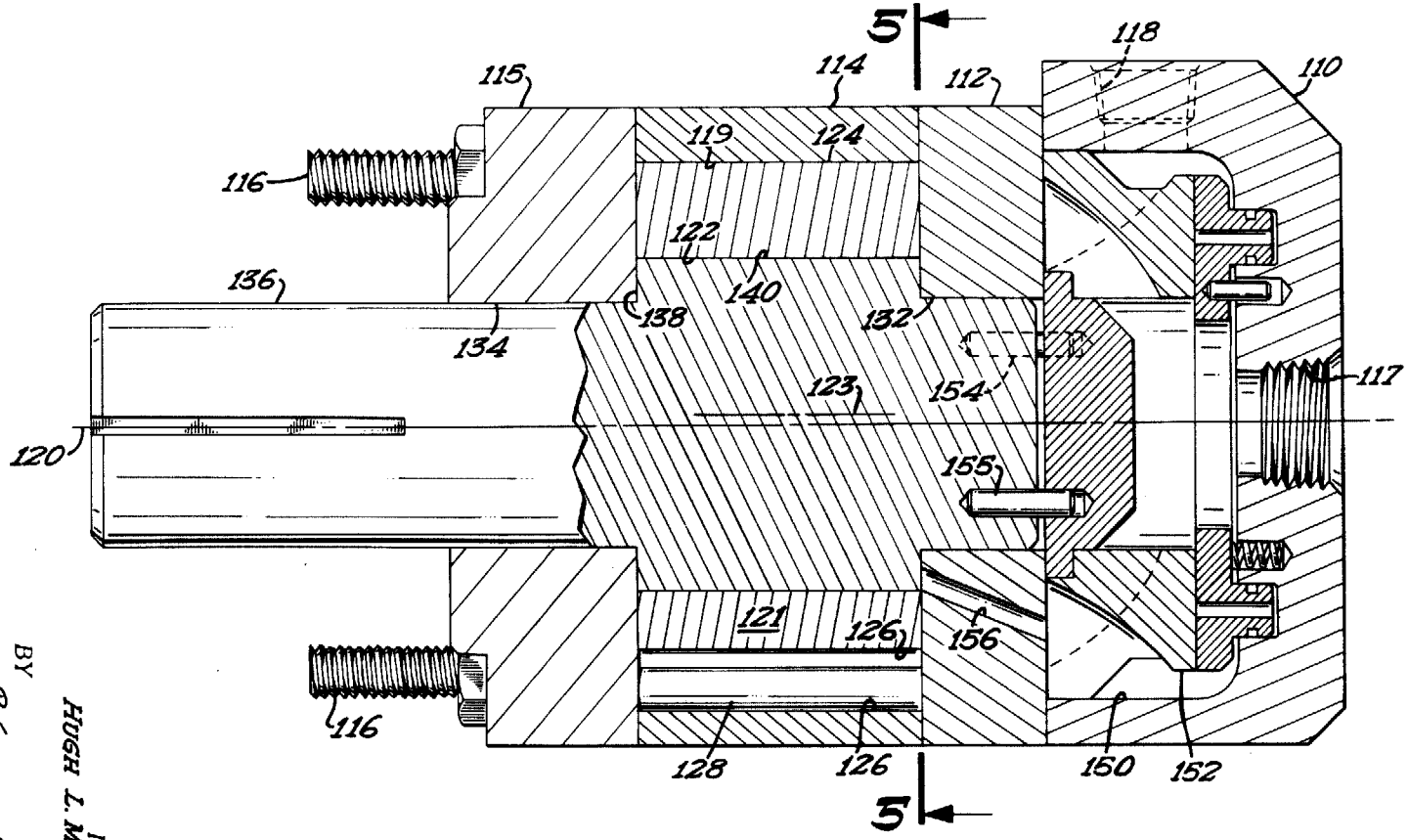
FIG. 4 is a longitudinal sectional view of a fluid pressure device in which a second embodiment of the torque transmitting device of the present invention is embodied.

Referring to FIG. 5, gerotor casing section 114 has a cylindrical bore a 119 which is concentrically disposed relative to a longitudinally extendnig axis 120. Disposed in bore 119 is a generally annularly shaped ring member 121 which has a plurality of circumferentially arranged internal teeth 122 which are circumferentially arranged relative to the geometric axis 123 of ring member 121. Ring member 121 is equal in axial length to casing section 114 and is in sealing engagement with adjacent annular surfaces of casing sections 112 and 115 between which ring member 121 is disposed. Ring member 121 has a cylindrically shaped outer surface 124 which is concentric relative to the geometric axis 123 of ring 121 and is adapted to have orbital movement about axis 120. The diameter of ring member surface 124 is illustrated as being equal to the diameter of casing bore 119 minus [twice] the distance between axes 120 and 123. The outside diameter of ring member 121 may be somewhat smaller than illustrated, relative to the casing bore 119, but not larger if interference is to be avoided.

A plurality of articulated holes 126 are provided between ring member 121 and casing section 114. Each hole 126 would have the two halves thereof in a cylindrically shaped locus if ring member 121 were concentrically positioned relative to casing section 114. [As] *Since* ring member 121 is always eccentrically disposed relative to casing section 114, [however,] none of the holes 126 ever have both surfaces thereof entirely within a single cylindrically shaped locus. In referring to the size of a hole 126 reference will be made to the "effective" diameter of the hole which will mean the diameter it would have if ring member 121 and casing section 114 were arranged concentrically.

Disposed in holes 126 are a corresponding number of cylindrically shaped rollers 128. The "effective" diameter of each roller 126 is equal to the diameter of a roller 128 therein plus [twice] the distance between axes 120 and 123. The rollers 126 provide torque transmitting connections between ring member 121 and casing section 114 and with the construction illustrated, having regard to the shapes and the relative sizes of the holes 126 and rollers 128, a true rolling action results between the rollers the shapes and the relative sizes of the holes 126 and casing section 114, during orbital movement of ring member 121 relative to casing section 114.

Casing sections 112 and 115 have bores 132 and 134 which constitute bearing surfaces and which are concentric relative to axis 120. Rotatably disposed and journalled in bores 132 and 134 is a shaft 136 which has an intermediate portion 138 of larger diameter than the end portions of the shaft. Intermediate shaft portion 138 has the form of an externally toothed star member which has at least one fewer teeth 140 than ring member 121 with the teeth 140 thereof being in meshing engagement with the teeth 122 of ring member 121. Rotation of shaft 136 causes rotation of star 138 about axis 120 which in turn imparts an orbital movement to ring member 121 which defines a circular orbital path about the axis 120. Ring member 121 and star member 138 comprise a gerotor mechanism which may be used as the cooperating elements of a fluid pressure motor or pump. During rotational movement of star member 138 about axis 120, and during orbital movement of ring member 121 about axis 120, the star teeth 140 thereof intermesh with the ring member teeth 122 in sealing engagement to form expanding and contracting cells which are equal in number to the number of [star] *ring* member teeth [140] *122*.

With further reference to FIG. 5, a vertical centerline 148 incidentally represents the line of eccentricity for the star and ring members for the particular position shown of the members relative to each other. During rotation of star member 138 in a clockwise direction, the ring member 122 would orbit in the opposite direction with the cells on the right side of the line of eccentricity expanding and the cells on the left side contracting. In operation a star member 138 having sixteen teeth will make one revolution about its own axis 120 for every sixteen times the ring member 121 orbits in the opposite direction about axis 120. When the fluid pressure device is utilized as a pump or a motor the star 138 is caused to rotate in one direction about its own axis and ring member 121 will be constrained to move in an orbital path about the same axis in the opposite direction by reason of the roller and hole construction provided between ring member 121 and casing section 114.

During the manufacturing operations the ring member 121 and casing section 114 may be arranged with fixtures or the like such that the respective axes 123 and 120 thereof are coaxial. A plurality of cylindrically shaped holes 126 may then be drilled which are equidistant from and circumferentially arranged relative to the coaxial axes 123 and 120. The holes 126 extend axially and are parallel relative to the coaxial axes 123 and 120 and are articulated by reason of being formed partially in the ring member 121 and partially in the casing section 114.

Valve casing section 110 has an axially extending bore 150 which is concentric relative to axis 120. Rotatably disposed in bore 150 is a generally cylindrically shaped valve 152 which is connected to shaft 136 by means of drive pins 154 and 155 so as to be rotatably therewith relative to casing sections 110 and 112. Casing section 112 has seventeen axially extending, circumferentially arranged passages 156 which are periodically in fluid communication with inlet and outlet passages in valve 152 in a known manner to provide for the flow of fluid from inlet port 118 to expanding chambers formed between the teeth of the star and ring members and for the flow of fluid from contacting chambers formed between the teeth of the star and ring members to the outlet port 119.

While two embodiments of the invention are described here, it will be understood that they are capable of modification, and that such modification, including a reversal of parts, may be made without departure from the spirit and scope of the invention as defined in the claims. An obvious modification, for example, would be to substitute balls or torque transmitting elements having other shapes for the rollers 42 and 128 in each of the embodiments illustrated.

What I claim is:

[1. A drive mechanism comprising a first member having an axis, a second member eccentrically disposed relative to said first member and adapted to orbit in a circular path about said axis a plurality of articulated holes extending longitudinally relative to said axis with each hole being formed partly in said first member and partly in said second member, and a plurality of cylindrically shaped rollers loosely disposed respectively in said holes, said rollers being of less diameter than said holes, the difference in diameters between one of said holes and one of said rollers disposed therein being equal to twice the eccentricity of said second member, whereby the orbital movement of said second member is facilitated.]

*2. In a hydraulic fluid operated device of the geroter type, said device having first member defining a casing, a fluid inlet and a fluid outlet communicating with the interior of said casing to provide a flow path for hydraulic fluid through said first member, a geroter star member and a geroter ring member disposed in said first member relative to an axis thereof, one of said geroter star or ring members being mounted for rotational movement about said axis and one of said geroter star or ring members being eccentrically mounted for orbital movement about said axis, whereby said geroter star and ring members will define expanding and contracting hydraulic fluid chambers during relative movement therebetween, and, valve means disposed in said first member for controlling the flow of hydraulic fluid between said inlet and outlet and through the expanding and contracting chambers, the improvement which comprises:*

*said device having a plurality of articulated holes extending longitudinally relative to said axis, a portion of the circumference of each of said holes being formed in one of said members and another radially opposite portion of said circumference being formed in another of said members, and a plurality of cylindrically shaped rollers loosely disposed respectively in said holes, said rollers being of less diameter than said holes, the difference in diameters between one of said holes and one of said rollers disposed therein is at least equal to the eccentricity of the eccentrically mounted one of said members relative to said axis, whereby orbital movement of said member is facilitated.*

*3. The invention of claim 2 wherein said geroter star is mounted for rotational movement about said axis.*

*4. The invention of claim 2 wherein said geroter ring and said first member define the plurality of articulated holes therebetween.*

*5. The invention of claim 2 wherein said geroter ring is eccentrically mounted relative to said axis and configured for orbital movement thereabout during operation of said device.*

References Cited

The following references, cited by the Examiner, are of record in the patented file of this patent or the original patent.

UNITED STATES PATENTS

| | | | |
|---|---|---|---|
| 916,914 | 3/1909 | Cooley | 64—31 |
| 1,936,573 | 11/1933 | Anger | 64—31 |
| 1,972,779 | 9/1934 | Kradoska | 64—9 R |
| 1,876,954 | 9/1932 | Johnson | 74—805 |
| 276,776 | 5/1883 | Clemons | 74—804 X |
| 987,430 | 3/1911 | Conant | 74—805 |
| 1,125,091 | 1/1915 | Gray | 74—805 |
| 2,181,162 | 11/1939 | Zaenger | 74—804 X |
| 2,989,951 | 6/1961 | Charlson | 418—167 |
| 3,512,905 | 5/1970 | Waldorff | 418—61 |
| 2,871,831 | 2/1959 | Patin | 418—61 |
| 3,289,601 | 12/1966 | Compton | 418—61 |
| 2,072,843 | 3/1937 | Stack | 64—31 |
| 2,733,580 | 2/1956 | Miller | 64—31 X |
| 2,874,594 | 2/1959 | Sundt | 74—805 |
| 3,304,808 | 2/1967 | Grant | 74—804 |

FOREIGN PATENTS

| | | | |
|---|---|---|---|
| 632,414 | 11/1949 | Great Britain | 418—61 |
| 1,286,924 | 1/1962 | France | 64—9 A |

CHARLES J. MYHRE, Primary Examiner

T. C. PERRY, Assistant Examiner

U.S. Cl. X.R.

64—31; 74—804

UNITED STATES PATENT OFFICE

CERTIFICATE OF CORRECTION

Patent No. RE. 28,051 Dated June 18, 1974

Inventor(s) Hugh L. McDermott

It is certified that error appears in the above-identified patent and that said Letters Patent are hereby corrected as shown below:

Column 3, line 32, "start" should read -- star --.

Column 4, line 28, Before "126" "roller" should read -- hole --.

Column 4, line 35, delete "the shapes and the relative sizes of the holes 26 and" and insert -- 126 and ring member 121, and between rollers 126 and --.

Signed and sealed this 24th day of September 1974.

(SEAL)
Attest:

McCOY M. GIBSON JR.
Attesting Officer

C. MARSHALL DANN
Commissioner of Patents